United States Patent
Nakagawa et al.

(10) Patent No.: US 10,540,169 B2
(45) Date of Patent: Jan. 21, 2020

(54) ELECTRONIC DEVICE CONFIGURED TO UPDATE PROGRAM STORED THEREIN USING DIFFERENCE DATA AND PROGRAM UPDATING METHOD USING DIFFERENCE DATA

(71) Applicant: Clarion Co., Ltd., Saitama-shi, Saitama (JP)

(72) Inventors: Yasuhiko Nakagawa, Ageo (JP); Kazuya Takahashi, Ageo (JP); Mitsuya Kato, Ageo (JP); Hisanori Kawakita, Saitama (JP); Nozomi Toyozaki, Tokyo (JP); Kazunori Tsunashima, Saitama (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 16/010,799

(22) Filed: Jun. 18, 2018

(65) Prior Publication Data
US 2018/0365002 A1 Dec. 20, 2018

(30) Foreign Application Priority Data

Jun. 19, 2017 (JP) ................................ 2017-119499
May 18, 2018 (JP) ................................ 2018-095813

(51) Int. Cl.
*G06F 9/44* (2018.01)
*G06F 8/65* (2018.01)
*H04L 29/08* (2006.01)

(52) U.S. Cl.
CPC ................ *G06F 8/65* (2013.01); *H04L 67/34* (2013.01)

(58) Field of Classification Search
CPC ...................................................... G06F 8/65
See application file for complete search history.

(56) References Cited

U.S. PATENT DOCUMENTS 9,420,065 B2 * 8/2016 Mayo ..................... H04L 67/34
9,507,585 B2   11/2016 Sotani et al.
(Continued)

FOREIGN PATENT DOCUMENTS

JP   2003-140914 A   5/2003
JP   2007-026318 A   2/2007
JP   2015-099528 A   5/2015

OTHER PUBLICATIONS

Extended European Search Report dated Nov. 8, 2018 in Application No. 18177367.2.

*Primary Examiner* — Hang Pan
(74) *Attorney, Agent, or Firm* — Foley & Lardner LLP

(57) ABSTRACT

An electronic device including a first microcomputer, a second microcomputer, and communication part configured to communicate with an external device is provided. The first microcomputer has a first storage configured to store a first program, and a first controller configured to execute a first process by using the first program stored in the first storage. The second microcomputer has a second storage configured to store a second program, and a second controller configured to execute a second process by using the second program stored in the second storage. The second controller of the second microcomputer acquires, from the external device, difference data for updating the first program stored in the first storage of the first microcomputer by using the communication part, and updates the first program stored in the first storage of the first microcomputer by using the acquired difference data and the second program stored in the second storage.

4 Claims, 2 Drawing Sheets

(56) References Cited

U.S. PATENT DOCUMENTS

| | | | |
|---|---|---|---|
| 9,626,177 B1* | 4/2017 | Madduri | G06F 8/65 |
| 10,119,828 B2 | 11/2018 | Cho | |
| 2005/0132357 A1* | 6/2005 | Shell | G06F 21/121 |
| | | | 717/174 |
| 2015/0347124 A1 | 12/2015 | Sotani et al. | |
| 2016/0334239 A1 | 11/2016 | Cho | |

* cited by examiner

ELECTRONIC DEVICE CONFIGURED TO UPDATE PROGRAM STORED THEREIN USING DIFFERENCE DATA AND PROGRAM UPDATING METHOD USING DIFFERENCE DATA

CROSS-REFERENCE TO RELATED APPLICATION

This application claims priority under 35 U.S.C. § 119 from Japanese Patent Application No. 2018-095813 filed on May 18, 2018, which claims priority from Japanese Patent Application No. 2017-119499 filed on Jun. 19, 2017. The entire subject matter of the application is incorporated herein by reference.

TECHNICAL FIELD

The present disclosures relate to an electronic device and a program updating method.

BACKGROUND

An electronic device in which a main microcomputer and a sub microcomputer are installed is conventionally known.

In such a conventionally known electronic device, the sub microcomputer is rewritten by using a rewriting tool (an external device). Specifically, reprogramming data for the sub microcomputer is transferred from the rewriting tool to the main microcomputer. The main microcomputer transfers the transferred reprogramming data to the sub microcomputer. The sub microcomputer rewrites a program in the sub microcomputer by using the transferred reprogramming data.

SUMMARY

The above reprogramming data is for rewriting the program in the sub microcomputer (i.e., for updating the entire program), and therefore the size of the data is large. The main microcomputer needs to acquire the large-size reprogramming data from the rewriting tool. Therefore, in Patent Document 1, there is a problem that data traffic between the rewriting tool and the main microcomputer is large.

Aspects of the present disclosures provide an electronic device and a program updating method which make it possible to update a program in a sub microcomputer while suppressing data traffic between an external device and a main microcomputer.

According to aspects of the present disclosures, there is provided an electronic device including a first microcomputer, a second microcomputer, and communication part configured to communicate with an external device. The first microcomputer has a first storage configured to store a first program, and a first controller configured to execute a first process by using the first program stored in the first storage. The second microcomputer has a second storage configured to store a second program, and a second controller configured to execute a second process by using the second program stored in the second storage. The second controller of the second microcomputer acquires, from the external device, difference data for updating the first program stored in the first storage of the first microcomputer by using the communication part, and updates the first program stored in the first storage of the first microcomputer by using the acquired difference data and the second program stored in the second storage.

According to aspects of the present disclosures, further provided is a program updating method for, in an electronic device including a first microcomputer having a first storage configured to store a first program and a first controller configured to execute a first process by using the first program stored in the first storage, and a second microcomputer having a second storage configured to store a second program and a second controller configured to execute a second process by using the second program stored in the second storage, updating the first program stored in the first storage of the first microcomputer. The program updating method includes an acquiring step in which the second controller of the second microcomputer acquires, from a predetermined external device, difference data for updating the first program stored in the first storage of the first microcomputer, and an updating step in which the second controller of the second microcomputer updates the first program stored in the first storage of the first microcomputer by using the acquired difference data and the second program stored in the second storage.

BRIEF DESCRIPTION OF THE ACCOMPANYING DRAWINGS

DETAILED DESCRIPTION

Hereinafter, embodiments of the present disclosures will be described with reference to the accompanying drawings.

Figure 1:
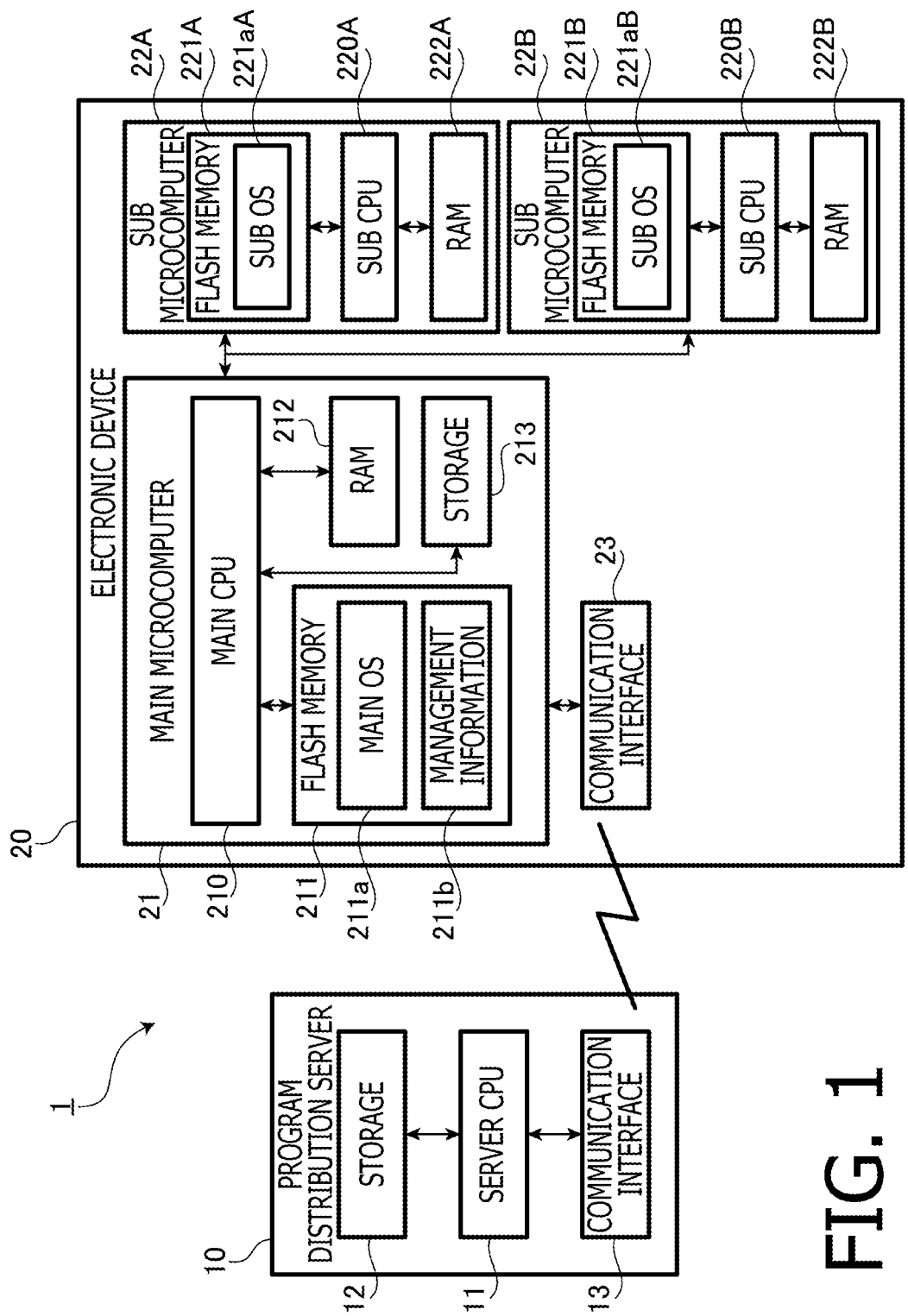
FIG. 1 is a block diagram showing a configuration of a program updating system according to an embodiment of the present disclosures.

FIG. 1 is a block diagram showing a configuration of a program updating system 1 according to an embodiment of the present disclosures. As shown in FIG. 1, the program updating system according to the present embodiment includes a program distribution server 10 (external device) and an electronic device 20.

The electronic device 20 is, for example, an onboard device installed in a vehicle travelling on a road, and is connected to the program distribution server 10 in a wirelessly communicable manner. It is noted that, in FIG. 1, main components necessary to explain the present embodiment are illustrated, and illustrations of a part of components, such as a chassis which is a general component for devices such as the server and the electronic device, are omitted.

The electronic device 20 is not limited to the onboard device but may be, for example, a portable terminal such as a smartphone, a feature phone, a PHS (Personal Handy phone System), a tablet terminal, a laptop PC, a PDA (Personal Digital Assistant), a PND (Portable Navigation Device), a portable game machine and the like.

As shown in FIG. 1, the electronic device 20 includes a main microcomputer 21 (second microcomputer), a sub microcomputer 22A (first microcomputer), a sub microcomputer 22B (first microcomputer), and a communication interface 23.

The main microcomputer 21 is a microcomputer in which a rich OS (Operating System) is installed, and integrally controls the whole electronic device 20.

The sub microcomputers 22A, 22B are microcomputers in which OSs which are different from each other and poorer than the OS installed in the main microcomputer 21 are respectively installed, and control specific components in the electronic device 20. For example, the sub microcomputer 22A controls a power supplying part of the electronic device 20, and the sub microcomputer 22B controls a touch panel of the electronic device 20. The main microcomputer 21 and the sub microcomputers 22A, 22B communicate through serial buses.

It is noted that, although the present embodiment illustrates a configuration in which two sub microcomputers are installed, the number of sub microcomputers to be installed in the electronic device 20 is not limited to two. The number of sub microcomputers to be installed in the electronic device 20 may be 1, or equal to or more than three.

The electronic device 20 wirelessly communicates with the program distribution server 10 through an information processing terminal having a communication function, such as a smartphone or a tablet terminal, or a TCU (Telematics Communication Unit) installed in a vehicle which is connected to the communication interface 23 (communication part). The communication interface 23 may be a wireless communication interface which enables wireless communication without the information processing terminal or the TCU.

As shown in FIG. 1, the main microcomputer 21 includes a main CPU (Central Processing Unit) 210 (second controller), a flash memory 211 (second storage part), a RAM (Random Access Memory) 212 and a storage 213 (third storage part).

In the flash memory 211, a main OS 211a (second program) for operating the main microcomputer 21 is stored. It is noted that the RAM 212 and the storage 213 may be separate components that are independent from the main microcomputer 21.

As shown in FIG. 1, the sub microcomputer 22A includes a sub CPU 220A (first controller), a flash memory 221A (first storage) and a RAM 222A. In the flash memory 221A, a sub OS 211aA (first program) for operating the sub microcomputer 22A is stored.

Similarly to the sub microcomputer 22A, the sub microcomputer 22B includes a sub CPU 220B (first controller), a flash memory 221B (first storage) and a RAM 222B. In the flash memory 221B, a sub OS 211aB (first program) for operating the sub microcomputer 22B is stored.

It is noted that, with respect to updating of the sub OS (which will be described in detail later), the sub microcomputer 22B operates in the same way as the sub microcomputer 22A does. Hereinafter, for convenience of explanation, descriptions on the sub microcomputer 22B will be simplified or omitted accordingly.

As shown in FIG. 1, the program distribution server 10 includes a server CPU 11, a storage 12 and a communication interface 13. The program distribution server 10 communicates wirelessly with the electronic device 20 through the communication interface 13.

In the storage 12, difference data created by a business operator or the like that manages the program distribution server 10 is stored. The difference data is binary data for a difference update of the sub OS 221aA or the sub OS 221aB that is stored in the flash memory of the sub microcomputer 22A or 22B. Hereinafter, the difference updating of the sub OS will be described with reference to FIG. 2 and FIG. 3.

Processes Between Program Distributing Server 10 and Main Microcomputer 21

Figure 2:
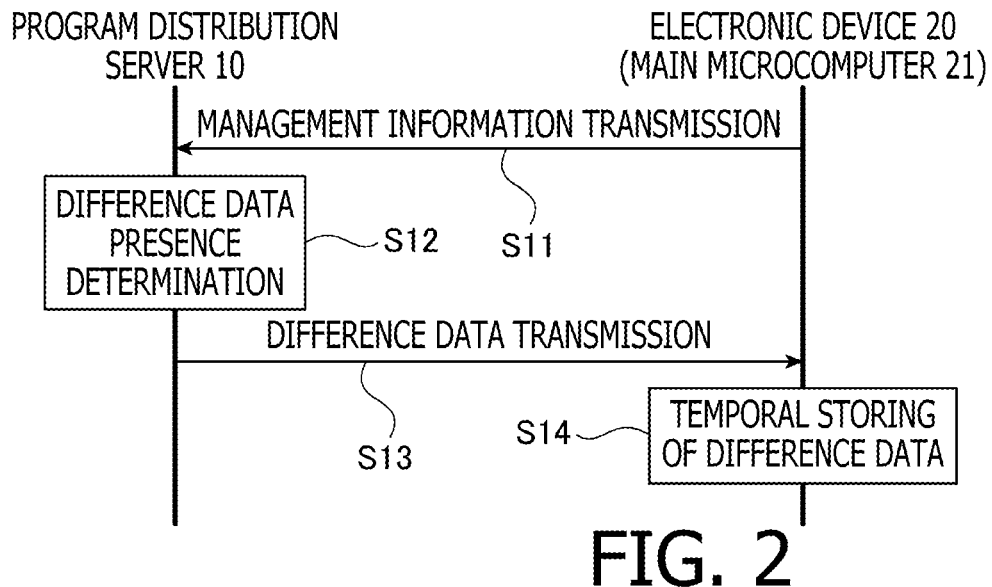
FIG. 2 is a sequence diagram showing processes between a program distribution server and a main microcomputer which are executed in the program updating system according to the embodiment of the present disclosures.

FIG. 2 is a sequence diagram showing processes between the program distribution server 10 and the main microcomputer 21.

FIG. 2, Process Step S11 (Transmission of Management Information)

In the flash memory 211 of the main microcomputer 21, a predetermined management information 211b is stored. The management information 211b is information necessary for the difference update of the sub OS 221aA and sub OS 221aB, and includes, for example, an "ID of the electronic device 20," a model name of the electronic device 20" and "current version information of each sub OS (sub OS 221aA and sub OS 221aB)." Hereinafter, for convenience of explanation, the "current version information of each sub OS" in the management information 211b will be referred to as "device side version information."

The "device side version information" includes information for identifying types of the sub OS 221aA and sub OS 221aB. The main microcomputer 21 (main CPU 210) periodically transmits the management information 211b stored in the flash memory 211 to the program distribution server 10.

FIG. 2, Process Step S12 (Determination of Difference Data Presence)

The program distribution server 10 (server CPU 11) receives the management information 211b transmitted from the main microcomputer 21 in the process step S11. In the storage 12, a plurality of pieces of difference data for updating sub OSs are stored for various models.

In the storage 12, a database is also stored. In the database, records for managing respective pieces of difference data currently stored in the storage 12 are registered. The record for each piece of difference data consists of a group of fields including, for example, a "type of sub OS to be updated by the piece of difference data" and "version information of the sub OS after update by using the piece of difference data," and is associated with the piece of difference data stored in the storage 12. Hereinafter, for convenience of explanation, the "version information of the sub OS after update by using the piece of difference data" will be referred to as "version information after update."

Each time the difference data is added to or deleted from the storage 12 by the business operator or the like, respective record is added to or deleted from the database.

The server CPU 11 searches the database based on the management information 211b received from the main microcomputer 21. Specifically, the server CPU 11 searches for a record having information identical to the type of sub OS identified by the "device side version information" in the management information 211b, and compares the "version information after update" in the searched record and the "device side version information (i.e., version information of a sub OS to be updated by difference data corresponding to the searched record)" in the management information 211b.

If the two pieces of version information are identical, the server CPU 11 determines that update of the sub OS is not necessary, and, for example, sends a notification notifying that update is not necessary to the main microcomputer 21.

By this notification, the main microcomputer 21 (main CPU 210) recognizes that updates of the sub OS 221aA and sub OS 221aB are not necessary.

FIG. 2, Process Step S13 (Transmission of Difference Data)

On the other hand, If the two pieces of version information are not identical, the server CPU 11 determines that update of the sub OS is necessary, and, for example, sends a notification notifying that update is necessary to the main microcomputer 21 and reads out difference data associated with the record from the storage 12 and transmits the difference data to the main microcomputer 21.

For example, if the "version information after update" indicates "Ver. 1. 1. 1" of the sub OS 221aA and the "device side version information" of the sub OS 221aA in the management information 211b indicates "Ver. 1. 1. 0," the server CPU 11 determines that update of the sub OS 221aA is necessary.

It is noted that, in place of the determining whether the version indicated by the "version information after update" and the version indicated by the "device side version information" are identical or not, the server CPU 11 may determine whether the "version information after update" indicates a newer version than the version indicated by the "device side version information."

Further, it has been described that the server CPU 11 sends a notification notifying that update is necessary to the main microcomputer 21 when it is determined that a sub OS needs to be updated, but the server CPU 11 may not send such notification to the main microcomputer 21. In this case, for example, the main microcomputer 21 may be configured to initiate update of the sub OS in response to receiving the difference data from the server CPU 11.

FIG. 2, Process Step S14 (Temporal Storing of Difference Data)

In the process step S14, the main CPU 210 stores (temporarily stores) the difference data downloaded from the program distribution server 10 in the process step S13 in the storage 213. Thereby, the processes between the program distribution server 10 and the main microcomputer 21 end.

Processes Between Main Microcomputer 21 and Sub Microcomputer

Figure 3:
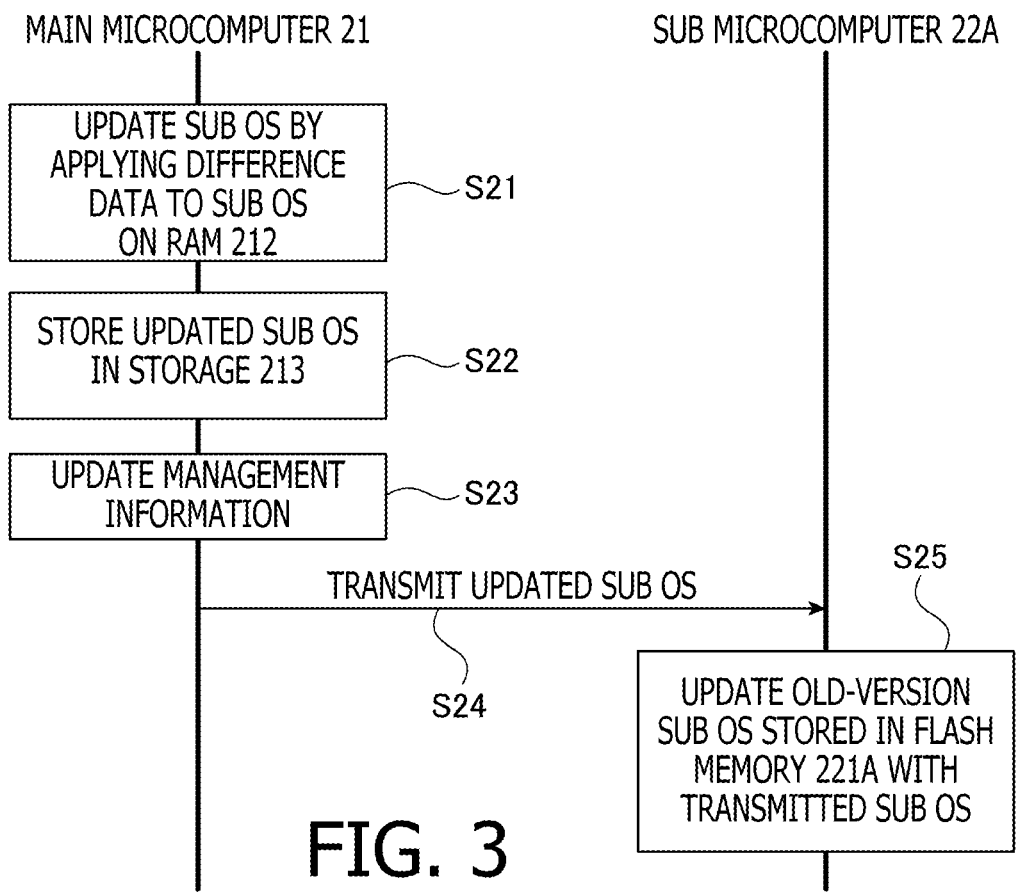
FIG. 3 is a sequence diagram showing processes between the main microcomputer and a sub microcomputer which are executed in the program updating system according to the embodiment of the present disclosures.

FIG. 3 is a sequence diagram showing processes between the main microcomputer 21 and the sub microcomputer 22A. It is noted that, in the following, description will be made by assuming that the main microcomputer 21 has downloaded difference data for the sub OS 221aA in the processes shown in FIG. 2.

FIG. 3, Process Step S21 (Updating of Sub OS)

In the storage 213, the sub OS 221aA and sub OS 221aB of which versions are identical to the sub OS 221aA and sub OS 221aB currently stored in the flash memories 221A, 221B are stored. Further, in the storage 213, the difference data that has been downloaded from the program distribution server 10 is stored. Information indicating a Sub OS to be updated is written in the header of the difference data.

The main CPU 210 refers to the header of the difference data stored in the storage 213 to identify a sub OS to be updated, and expands the identified sub OS to be updated and the difference data on the RAM 212. The main CPU 210 applies the difference data to the sub OS on the RAM 212 by using a difference update library of the main OS 211a. Thereby, the sub OS is updated. More specifically, the main CPU 210 identifies that a sub OS to be updated is the sub OS 221aA by referring to the header of the difference data for the sub OS 221aA stored in the storage 213, and expands the sub OS 221aA and the difference data for the sub OS 221aA stored in the storage 213 on the RAM 212. The main CPU 212 applies the difference data to the sub OS 221aA on the RAM 212 by using the difference update library of the main OS 211a. Thereby, the updated sub OS 221aA is created in the RAM 212.

In general, many libraries that provide a difference update function and the like are compatible with rich OSs such as Linux (registered trademark) and Windows (registered trademark), but are in many cases not compatible with originally developed OSs. In the present embodiment, OSs originally developed by, for instance, a maker of the electronic device 20 are adopted as the sub OS 221aA and sub OS 221aB. Therefore, the libraries that provide the difference update function and the like are not compatible with the sub OS 221aA and sub OS 221aB.

In view of the above circumstance, the electronic device 20 according to the present embodiment is configured to update the sub OSs by using a difference update library of the main OS 211a. That is, it is possible to update the sub OSs without separately preparing difference update libraries in the sub OSs. Since it is sufficient to prepare a difference update library in the main microcomputer 21, the required number of licenses of difference update libraries can be reduced as compared to a case where, for example, a difference update library is prepared for each of the main microcomputer 21 and the sub microcomputers. Furthermore, even in a case where the sub OSs are OSs with which libraries that provide a difference update function and the like are compatible, by configuring to update the sub OSs by using the difference update library of the main OS as in the present embodiment, all the sub OSs can be updated by preparing the difference update library only in the main microcomputer 21.

As described above, the difference data is binary data. Therefore, the main CPU 210 can update the sub OSs regardless of the sub OSs to be updated.

FIG. 3, Process Step S22 (Storing of Updated Sub OS)

The main CPU 210 stores the sub OS updated in the process step S21 in the storage 213. It is noted that the old version sub OS stored in the storage 213 may be deleted by overwriting or, for example, the old version sub OSs may be remained in the storage 213 for a predetermined number of generations.

FIG. 3, Process Step S23 (Updating of Management Information)

Version information of the Sub OS after update is written in the header of the difference data. The main CPU 210 refers to the header of the difference data and updates the "device side version information" in the management information 211b. As an example, in a case where the version of the sub OS 221aA before update is Ver. 1. 1. 0, the main CPU 210 refers to the version information (e.g., Ver. 1. 1. 1)

written in the header of the difference data and updates "Ver. 1. 1. 0" in the management information 211b to "Ver. 1. 1. 1."

FIG. 3, Process Step S24 (Transmission of Updated Sub OS)

The main CPU 210 transmits the updated sub OS stored in the storage 213 in the process step S22 to a sub microcomputer, which has the sub OS to be updated, identified in the process step S21. In the present embodiment, the main CPU 210 transmits the updated sub OS 221aA to the sub microcomputer 22A. It is noted that the transmitted data may include, for example, a command that instructs the sub microcomputer 22A to update the old version sub OS 221aA stored in the flash memory 221A with the transmitted updated sub OS 221aA.

FIG. 3, Process Step S24 (Updating of Sub OS)

The sub CPU 220A updates the old version sub OS 221aA stored in the flash memory 221A with the new version sub OS 221aA transmitted in the process step S24.

As described above, in the present embodiment, the configuration in which the sub OSs in the electronic device 20 are updated by using difference data is adopted. Therefore, time required to download data necessary for updating can be shortened and packet quantity required for the update can be reduced as compared to a configuration in which sub OSs are updated using the entire update data. The greater the number of sub microcomputers installed in the electronic device, the greater the effect of shortening the time required to download data necessary for the update and the effect of reducing packet quantity required for the update by adopting the above-described configuration.

Further, in the present embodiment, the main microcomputer 21 (storage 213) has the sub OSs of the same versions as those the sub microcomputers (flash memory 221A, 221B) have. Therefore, in updating the sub OSs, the main microcomputer 21 does not need to read the sub OSs from the sub microcomputers. Furthermore, the sub OSs which the main microcomputer 21 has also serve as backups of the sub OSs which the sub microcomputers have.

In the foregoing description, a case where the number of sub OS to be updated in one (i.e., only the sub OS 221aA) has been illustrated. However, there is a case where both the sub OS 221aA and sub OS 221aB are to be updated at the same time. In this case, the main CPU 210 downloads pieces of difference data for both the sub OS 221aA and sub OS 221aB from the program distribution server 10, updates both the sub OS 221aA and sub OS 221aB using respective pieces of difference data, and transmits the updated sub OS 221aA and sub OS 221aB to the sub microcomputer 22A and sub microcomputer 22B, respectively. The sub CPUs 220A, 220B respectively update the old version sub OSs 221aA, 221aB stored in the flash memories 221A, 221B with the new version sub OSs 221aA, 221aB transmitted from the main microcomputer 21.

The foregoing is the description of an exemplary embodiment of the present disclosures. Embodiments of the present disclosures are not limited to the above-described embodiment, and various modifications are possible within the scope of the technical concept of the present disclosures. For example, appropriate combinations of embodiments exemplarily specified in the specification and/or obvious embodiments are also included in the embodiments of the present disclosures.

In the above-described embodiment, the main microcomputer 21 (storage 213) has the same sub OSs (sub OSs 221aA, 221aB) as the sub microcomputers (flash memories 221A, 221B) have. However, in an alternative embodiment, the electronic device 20 may be configured not to include the storage 213 (that is, the main microcomputer 21 may not have the sub OSs). In this case, upon downloading the difference data from the program distribution server 10, the main CPU 210 executes the following processes (1)-(5) instead of the process steps S21-S22 shown in FIG. 3.

(1) The main CPU 210 expands the downloaded difference data on the RAM 212.

(2) The main CPU 210 refers to the header of the difference data expanded on the RAM 212 to identify a sub OS to be updated.

(3) The main CPU 210 requests a sub microcomputer, corresponding to the identified sub OS to be updated, to transmit the sub OS.

(4) The main CPU 210 expands the sub OS, transmitted from the sub microcomputer 212 in response to the request, on the RAM.

(5) The main CPU 210 applies the difference data to the sub OS transmitted from the sub microcomputer in response to the request by using the difference update library of the main OS 211a, thereby creating an updated sub OS in the RAM 212.

After the execution of the processes (1)-(5) above, the same processes as the process steps S23-S25 shown in FIG. 3 are executed between the main microcomputer 21 and the sub microcomputer. It is noted that, in this alternative embodiment, since the main microcomputer does not have the storage 213, in the process step S24, the updated sub OS is transmitted from the RAM 212 to the sub microcomputer that has the sub OS to be updated. In this alternative embodiment, since the storage 213 can be omitted from the electronic device 20, the cost of the electronic device 20 can be suppressed.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

What is claimed is:

1. An electronic device, comprising:
   a first microcomputer having:
      a first storage configured to store a first program; and
      a first controller configured to execute a first process for operating the first microcomputer by using the first program stored in the first storage,
   a second microcomputer having:
      a second storage configured to store a second program different from the first program;
      a third storage configured to store the first program of which a version is identical to a current version of the first program stored in the first storage;
      a fourth storage configured to store first version information indicating the current version of the first program stored in the first storage; and a second controller configured to execute a second process for operating the second microcomputer by using the second program stored in the second storage, and a communication part configured to communicate with an external device, wherein the second process executed by using the second program includes:

acquiring, from the external device, difference data for updating the first program stored in the third storage by using the communication part, the difference data including second version information indicating a version of the first program after update by using the difference data;

updating the first program stored in the third storage by using the acquired difference data;

updating the first version information stored in the fourth storage with the second version information; and transmitting the updated first program stored in the third storage to the first microcomputer, wherein the first controller of the first microcomputer is further configured to:

store the updated first program transmitted from the second microcomputer in the first storage; and execute the first process by using the updated first program, wherein the first microcomputer is a plurality of first microcomputers, wherein the difference data includes information indicating one microcomputer to be updated among the plurality of first microcomputers, and wherein the second controller of the second microcomputer is further configured to:

identify the one microcomputer to be updated based on the information upon acquiring the difference data by using the communication part, and update the first program stored in the first storage of the identified one microcomputer.

2. The electronic device according to claim 1, wherein the first program stored in the third storage is not executed by the second microcomputer.

3. A program updating method for, in an electronic device comprising a first microcomputer and a second microcomputer, the first microcomputer having a first storage configured to store a first program and a first controller configured to execute a first process for operating the first microcomputer by using the first program stored in the first storage, the second microcomputer having a second storage configured to store a second program different from the first program, a third storage configured to store the first program of which a version is identical to a current version of the first program stored in the first storage, a fourth storage configured to store first version information indicating the current version of the first program stored in the first storage, and a second controller configured to execute a second process for operating the second microcomputer by using the second program stored in the second storage, updating the first program stored in the first storage of the first microcomputer, the method comprising:

acquiring, by the second controller of the second microcomputer, from a predetermined external device, difference data for updating the first program stored in the third storage, the difference data including second version information indicating a version of the first program after update by using the difference data;

updating, by the second controller of the second microcomputer, the first program stored in the third storage by using the acquired difference data;

updating, by the second controller of the second microcomputer, the first version information stored in the fourth storage with the second version information;

transmitting, by the second controller of the second microcomputer, the updated first program stored in the third storage to the first microcomputer;

storing, by the first controller of the first microcomputer, the updated first program transmitted from the second microcomputer in the first storage; and executing, by the first controller of the first microcomputer, the first process by using the updated first program, wherein the first microcomputer is a plurality of first microcomputers and the difference data includes information indicating one microcomputer to be updated among the plurality of first microcomputers, wherein the method further comprises:

identifying, by the second controller of the second microcomputer, the one microcomputer to be updated based on the information upon acquiring the difference data, and wherein the updating the first program stored in the third storage includes updating, by the second controller of the second microcomputer, the first program stored in the first storage of the first identified one microcomputer.

4. The program updating method according to claim 3, wherein the first program stored in the third storage is not executed by the second microcomputer.

* * * * *